US008516228B2

(12) United States Patent
Alexander et al.

(10) Patent No.: US 8,516,228 B2
(45) Date of Patent: Aug. 20, 2013

(54) SUPPORTING PARTIAL RECYCLE IN A PIPELINED MICROPROCESSOR

(75) Inventors: Khary J. Alexander, Poughkeepsie, NY (US); Michael Billeci, Tivoli, NY (US); Fadi Y. Busaba, Poughkeepsie, NY (US); Bruce C. Giamei, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 577 days.

(21) Appl. No.: 12/051,486

(22) Filed: Mar. 19, 2008

(65) Prior Publication Data

US 2009/0240921 A1    Sep. 24, 2009

(51) Int. Cl.
  *G06F 9/00* (2006.01)
(52) U.S. Cl.
  USPC .......................................... 712/218; 712/219
(58) Field of Classification Search
  USPC ....................................................... 712/218
  See application file for complete search history.

(56) References Cited

U.S. PATENT DOCUMENTS

| 5,442,767 | A | 8/1995 | Eickemeyer et al. |
| 6,047,370 | A * | 4/2000 | Grochowski .................. 712/219 |
| 6,775,298 | B1 | 8/2004 | Aggarwal |
| 2006/0095678 | A1* | 5/2006 | Bigelow et al. ............... 711/137 |
| 2006/0155965 | A1* | 7/2006 | Altman et al. ................ 712/215 |
| 2006/0242384 | A1 | 10/2006 | Ahmed et al. |

OTHER PUBLICATIONS

"IBM® z/Architecture Principles of Operation", Publication No. SA22-7832-05, 6th Edition, Apr. 2007. 1,215 pages separated into 4 electronic attachments.

* cited by examiner

*Primary Examiner* — Eric Coleman
(74) *Attorney, Agent, or Firm* — Cantor Colburn LLP; John Campbell

(57) ABSTRACT

A computer processing system is provided. The computer processing system includes a first datastore that stores a subset of information associated with an instruction. A first stage of a processor pipeline writes the subset of information to the first datastore based on an execution of an operation associated with the instruction. A second stage of the pipeline initiates reprocessing of the operation associated with the instruction based on the subset of information stored in the first datastore.

16 Claims, 4 Drawing Sheets

SUPPORTING PARTIAL RECYCLE IN A PIPELINED MICROPROCESSOR

BACKGROUND OF THE INVENTION

This invention relates generally to partial instruction recycling in a pipelined microprocessor, and more particularly to providing virtual instruction packets for supporting performance features of a microprocessor during partial instruction recycling.

Speculative execution is performed by some microprocessors to optimize performance. Speculative execution executes subsequent instructions before a first instruction completes in hopes that the early results of the first instruction are resolved to be correct.

Performing speculative execution in conjunction with a recycle mechanism minimizes the effect of execution dependencies. In one example, speculation may be performed on a result of data cache (DCache) access. In the case where the speculation is incorrect (a DCache miss), the instruction is repeated or recycled. This method allows for a performance gain over always stalling the pipeline until the result (e.g. fetched DCache data address) of an operation is known for certain. To recycle the instruction, a side recycle queue maintains a copy of the instruction for pending instructions until the instruction is past a certain recycle point.

For further optimization, partial recycles can be performed on operations of a multicycle instruction. For example, when a reject operation occurs in the middle of processing a multicycle instruction, the rejected operation is repeated from the point of the reject. This advantageous over restarting the entire instruction, and sometimes needed for forward progress, where a multi-cycle instruction may be interrupted/rejected many times during execution. This partial restart can not be supported by the information in the recycle queue which only supports full recycle and would have been removed at this point. The processing elements that are dependent on the instruction information from the recycle queue are unable to operate.

It would be advantageous to be able to maintain instruction information for use by processing elements such as, Address Generation Interlock (AGI) and Reliability, Availability, and Serviceability (RAS) checking.

BRIEF SUMMARY OF THE INVENTION

An exemplary embodiment includes a computer processing system. The computer processing system includes a first datastore that stores a subset of information associated with an instruction. A first stage of a processor pipeline writes the subset of information to the first datastore based on an execution of an operation associated with the instruction. A second stage of the pipeline initiates reprocessing of the operation associated with the instruction based on the subset of information stored in the first datastore.

Another exemplary embodiment includes a method of processing instructions. The method includes writing a subset of information to a first datastore based on an execution of an operation associated with a processor instruction; and initiating reprocessing of the operation associated with the instruction based on the subset of information stored in the first datastore.

A further exemplary embodiment includes a computer program product for processing instructions. The computer program product includes a computer-readable storage medium for storing instructions for executing instruction processing. The instruction processing includes a method of: writing a subset of information to a first datastore based on an execution of an operation associated with a processor instruction; and initiating reprocessing of the operation associated with the instruction based on the subset of information stored in the first datastore.

Additional features and advantages are realized through the techniques of the present invention. Other embodiments and aspects of the invention are described in detail herein and are considered part of the claimed invention. For a better understanding of the invention with advantages and features, refer to the description and to the drawings.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

An exemplary embodiment of the present invention provides tracking a virtual packet relating to a partially recycled operation of an instruction through a pipeline of a processor. The virtual packet stores information to enable AGI and RAS checking to be performed on the instruction before completion of the instruction.

Figure 1:
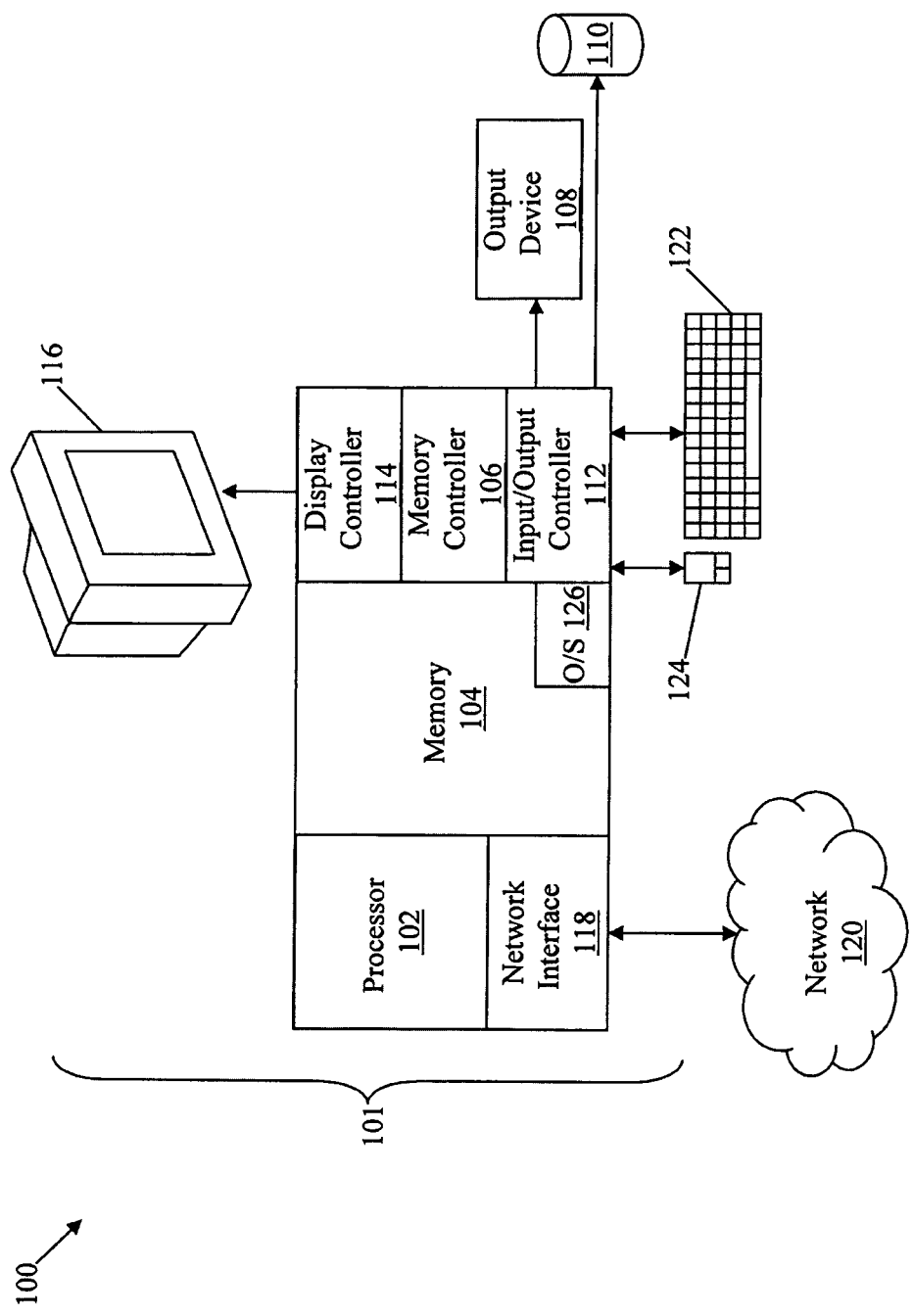
FIG. 1 is a block diagram illustrating a computing system that includes a partial recycle support system in accordance with an exemplary embodiment.

Turning now to FIG. 1, a block diagram illustrates an exemplary computing system 100 that includes a partial recycle support system in accordance with the present disclosure. The computing system 100 is shown to include a computer 101. As can be appreciated, the computing system 100 can include any computing device, including but not limited to, a desktop computer, a laptop, a server, a portable handheld device, or any other electronic device. For ease of the discussion, the disclosure will be discussed in the context of the computer 101.

The computer 101 is shown to include a processor 102, memory 104 coupled to a memory controller 106, one or more input and/or output (I/O) devices 108, 110 (or peripherals) that are communicatively coupled via a local input/output controller 112, and a display controller 114 coupled to a display 116. In an exemplary embodiment, the system 100 can further include a network interface 118 for coupling to a network 120. The network 120 transmits and receives data between the computer 101 and external systems. In an exemplary embodiment, a conventional keyboard 122 and mouse 124 can be coupled to the input/output controller 112.

In various embodiments, the memory 104 stores instructions that can be executed by the processor 102. The instructions stored in memory 104 may include one or more separate programs, each of which comprises an ordered listing of executable instructions for implementing logical functions. In the example of FIG. 1, the instructions stored in the memory 104 include a suitable operating system (OS) 126. The operating system 126 essentially controls the execution of other computer programs and provides scheduling, input-output control, file and data management, memory management, and communication control and related services.

When the computer 101 is in operation, the processor 102 is configured to execute the instructions stored within the memory 104, to communicate data to and from the memory 104, and to generally control operations of the computer 101 pursuant to the instructions. The processor 102 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions. The processor 102 includes the partial recycle systems and methods as described herein.

Figure 2:
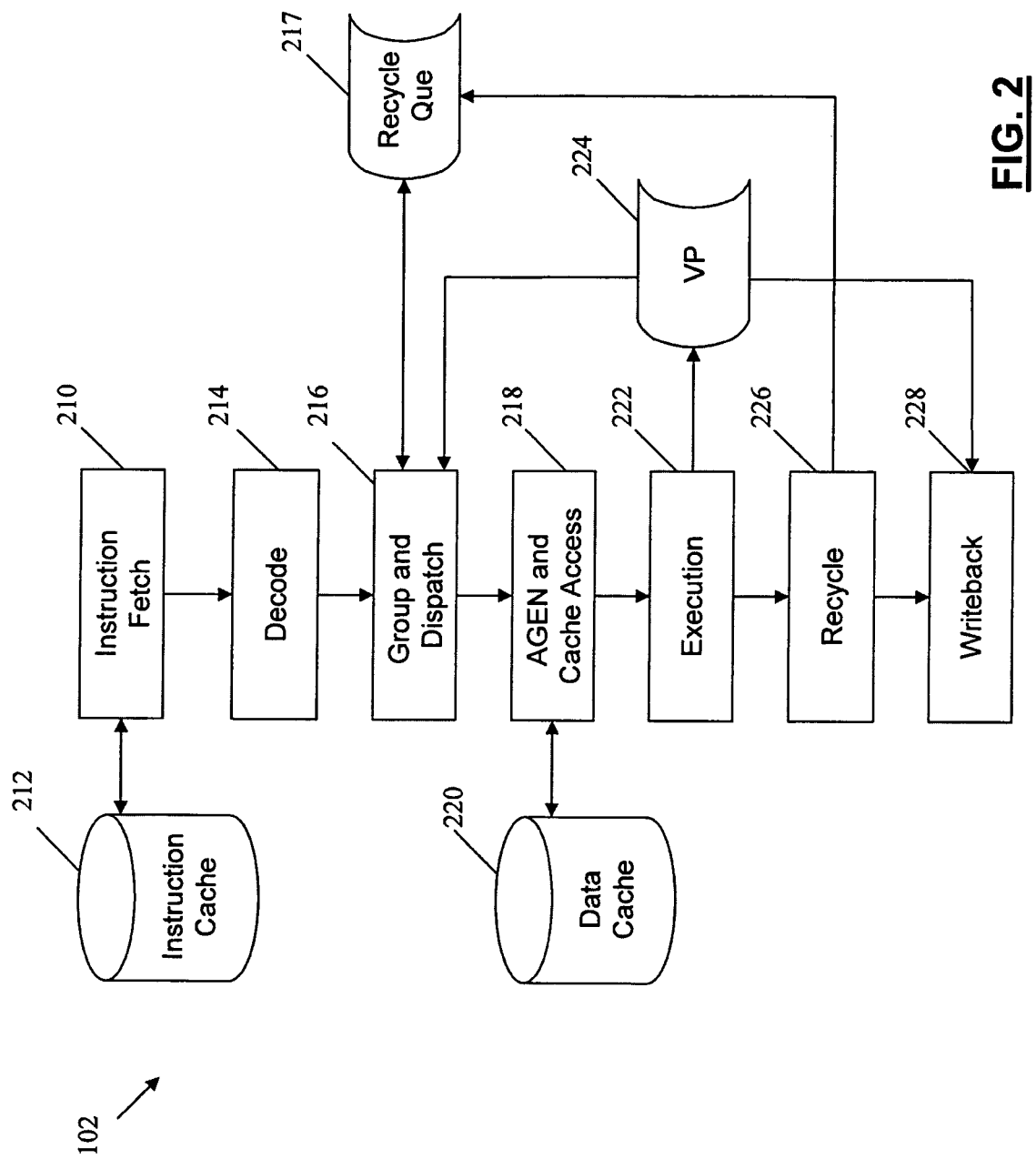
FIG. 2 is a block diagram illustrating a processor of the computing system and that includes the partial recycle support system in accordance with an exemplary embodiment.

Turning now to FIG. 2, the processor 102 of FIG. 1 is illustrated in accordance with an exemplary embodiment. The processor 102 includes one or more pipeline stages. In various embodiments, the processor 102 may support multiple pipeline paths for instruction execution, e.g., a superscaler architecture. For ease of the discussion, the disclosure will be discussed in the context of single pipeline path as illustrated in FIG. 2.

As shown in FIG. 2, the pipeline stages can include, but are not limited to, an instruction fetch stage 210, a decode stage 214, a group and dispatch stage 216, an address generation (AGEN) and data cache access stage 218, an execution stage 222, a recycle stage 226, and a writeback stage 228. As can be appreciated, the operations of the pipeline stages can be combined and/or further partitioned into other pipeline stages, not shown.

In various embodiments, the instruction fetch stage 210 acquires instructions to be processed from an instruction cache 212 and passes the instructions to the instruction decode stage 214. The instruction decode stage 214 performs full instruction decodes, generating instruction processing information which is passed to the group and dispatch stage 216. The group and dispatch stage 216 groups and detects dependencies (e.g., AGI) and passes the instructions in a stream to the AGEN and cache access stage 218 once these dependencies have been resolved. To facilitate reprocessing of an instruction, if needed, the group and dispatch stage stores the instructions in a recycle queue 217. The recycle queue 217 can be, for example, an X deep (e.g., X=ten) entry recycle queue such that the instruction information is preserved until the instruction passes through the execution stage 222.

The AGEN and cache access stage 218 calculates an address of a data cache 220, performs data cache access operations (e.g., fetch and store), performs cache data formatting, and routes the information to the execution stage 222. The execution stage 222 performs the function of the instructions based on the data from the data cache 220. The execution stage 222 further stores instruction information in a virtual packet 224 to assist with partial recycling of a multicycle instruction.

The recycle stage 226 determines whether the execution is rejected and if rejected, whether a partial recycle or a full recycle is needed. A full recycle is needed, for example, when a data cache access occurs on a single cycle operation. A partial recycle is needed, for example, when a data cache miss occurs sometime after the first cycle/access of a multicycle operation. If a recycle is needed, the instruction is re-processed through the pipeline stages using the information stored in either the recycle queue 217 or the virtual packet 224. If a recycle is not needed, the recycle stage 226 can remove the instruction information from the recycle queue 217. Once the instruction has completed processing, the writeback stage 228 writes the results of the execution to one or more registers and performs RAS checking.

In one example, when a full recycle is needed, the entire instruction is recycled. The instruction is acquired from the recycle queue 217 and used by the group and dispatch stage 216 to initiate reprocessing of the instruction. In another example, when a partial recycle is needed, the instruction is recycled from the reject point (i.e., only the rejected operation is recycled). The instruction information stored in the virtual packet 224 is used by the group and dispatch stage 216 to initiate reprocessing of the operation. The virtual packet 224 maintains the processing information for the remainder of the processing of the instruction, allowing any instruction dependent features to operate during or after the partial recycle. Such features can include, but are not limited to, AGI and RAS checking.

Figure 3:
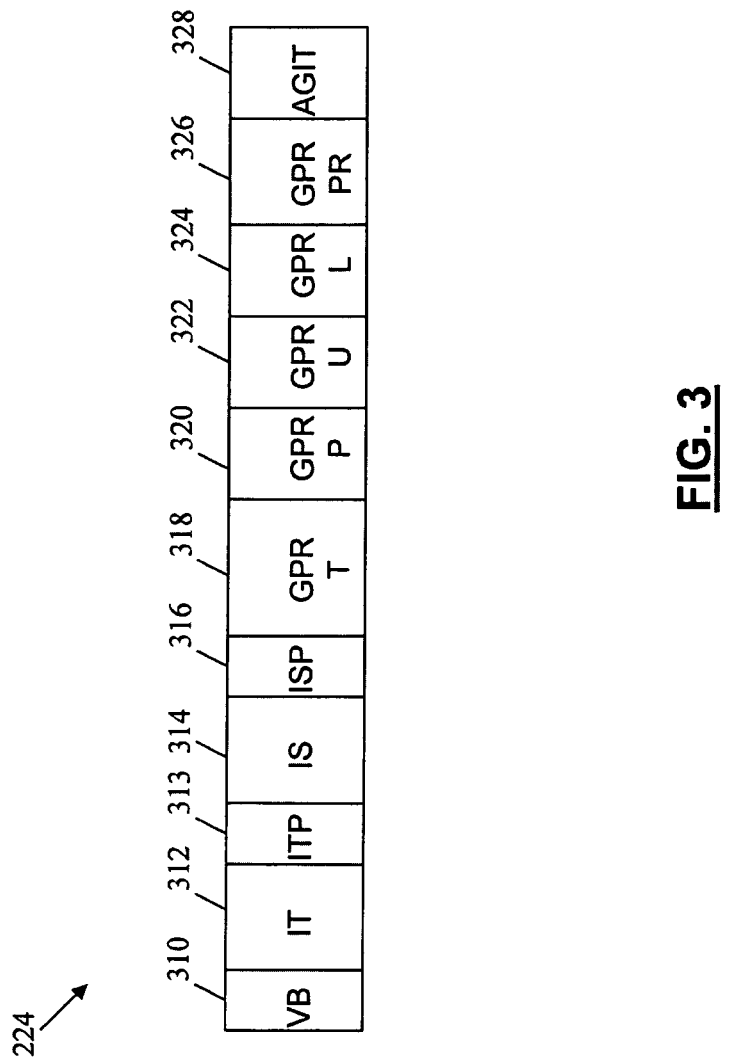
FIG. 3 is a block diagram illustrating the contents of a virtual packet of the partial recycle support system in accordance with an exemplary embodiment.

Turning now to FIG. 3, in one example, the virtual packet 224 stores information including, but not limited to, a validity indicator, an instruction type, an instruction state, parity information, and general purpose register (GPR) information. As shown in FIG. 3, an exemplary embodiment stores a packet valid bit (VB) 310, an instruction type (IT) 312, an instruction type parity (ITP) 313, an instruction state (IS) 314, an instruction state parity (ISP) 316, a general purpose register target (GPRT) 318, a general purpose register parity (GPRP) 320, a general purpose register write upper indicator (GPRU) 322, a general purpose register write lower indicator (GPRL) 324, a general purpose register write pair indicator (GPRPR) 326, and an AGI type (AGIT) 328.

The valid bit 310 can be a single bit indicating the validity of the data in the packet and can trigger partial recycle action on this data by the group and dispatch stage 216 (FIG. 2). The instruction type 312 can be multiple bits (e.g., 4 bits) that indicate the type of instruction and can, for example, differentiate functional units (e.g. fixed-point vs. floating-point) used to execute the remainder of the instruction. The instruction state 314 can be multiple bits (e.g. 4 bits) that indicate the state of the instruction at the point of partial recycle, creating expectations as to the processing of the instruction once operation restarts. This could include the number of execution cycles that have elapsed or that remain. The general purpose register information, GPRT 318, GPRU 320, and GPRL 322, specify the register and section (e.g., upper and/or lower 32-bits) that will be updated by the partially recycled instruction. This is utilized by the Address Generation Interlock (AGI) logic in conjunction with the AGIT 328 to facilitate the tracking of targets through the processor pipeline. There parity information, ITP 313, ISP 316, and GPRP 320, are stored together with the associated fields to provide RAS checking coverage in case there is a bit-flip error in any of the fields of the packet.

Figure 4:
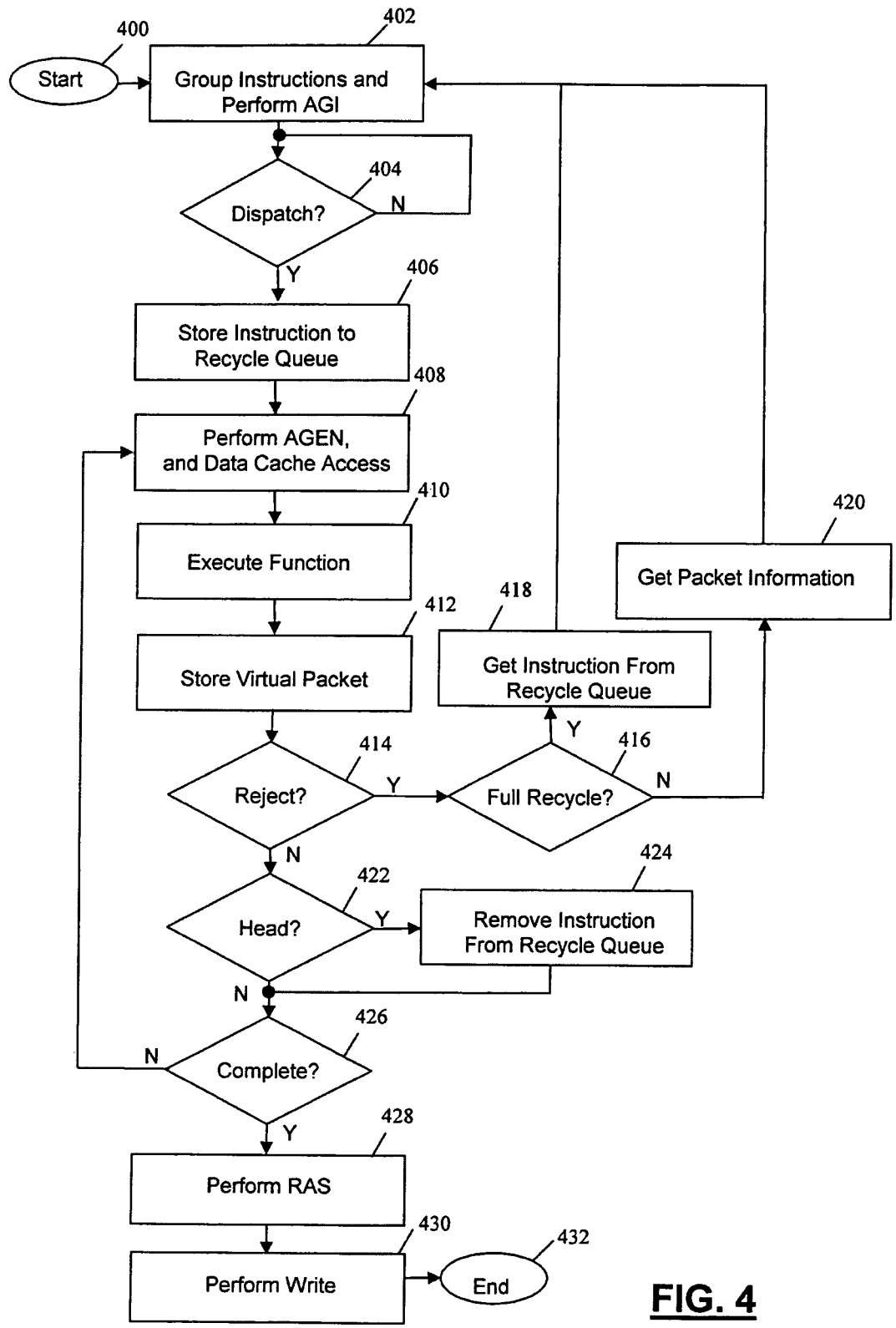
FIG. 4 is a flowchart illustrating a partial recycle support method in accordance with an exemplary embodiment.

Turning now to FIG. 4, a flowchart illustrates a partial recycle support method in accordance with an exemplary embodiment. As can be appreciated in light of the disclosure, the order of operation within the method is not limited to the sequential execution as illustrated in FIG. 4, but may be performed in one or more varying orders as applicable and in accordance with the present disclosure. In various embodiments, the method may be scheduled to run based on certain events and/or scheduled to run continually during processor operation.

In one example, the method may begin at 400. The instructions are grouped and AGI checking and resolution is performed at 402. Upon dispatch of the instructions at 404, the instruction is stored in the recycle queue 217 (FIG. 2) at 406. Address generation, and data cache accesses are performed at 408. The function of the instruction is executed at 410. After each cycle of execution, the instruction information as discussed above is stored in the virtual packet 224 (FIG. 2) at 412 in preparation for a potential partial recycle from that point.

If, however, the execution of the operation is rejected as detected at 414 and the instruction requires a full recycle at 416, the instruction from the recycle queue 217 (FIG. 2) is retrieved at 418 and re-processing of the entire instruction is performed at 402-412. If the execution of the operation is rejected at 414 and the instruction does not require a full recycle rather, but instead a partial recycle at 416, the information stored in the virtual packet 224 (FIG. 2) is retrieved at 420 and re-processing is performed based on the virtual packet information at 402-412 at the point of reject.

If the execution of the operation is not rejected at 414, however, and the operation being processed is the head or front of the instruction, the instruction is removed from the recycle queue 217 (FIG. 2) as the instruction can no longer be fully recycled at 424 and the instruction is evaluated to determine if the processing is complete at 426. If the processing is complete at 426, RAS checking is performed at 428 and the write to a register is performed at 430. Thereafter, the method may end at 432. If, however, the processing is not complete (e.g., a multicycle instruction) at 426, further processing is performed at 408-412.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A computer processing system for executing an instruction for performing a first operation and a second operation, the system comprising:
a first datastore;
a first stage of a processor pipeline coupled to the first datastore; and
a second stage of the pipeline, coupled to the first stage of the processor pipeline, the system configured to perform a method comprising:
storing, by the processor pipeline, a subset of information to the first datastore based on execution progress of the instruction; and
based on a rejection event of the second operation following a successful completion of the first operation initiating, by the second stage of the processor pipeline, a partial reprocessing, the partial reprocessing comprising using the subset of information stored in the first datastore to continue processing the instruction, at the first stage of the pipeline, with the second operation;
based on a rejection event of a first occurring operation of the instruction initiating by the second stage of the processor pipeline, full reprocessing, the full reprocessing comprising processing the instruction, at the first stage of the pipeline as a new instruction.

2. The system of claim 1 wherein the subset of information includes validity data, an instruction type, an instruction state, parity data, and general purpose register data.

3. The system of claim 1 wherein the first stage is an execution stage of the processor pipeline.

4. The system of claim 1 wherein the second stage is a grouping stage of the processor pipeline.

5. The system of claim 1 further comprising one or more additional stages of the processor pipeline that perform the reprocessing of the operation of the instruction based on the subset of information stored in the first datastore.

6. The system of claim 1 further comprising:
a second datastore; and
a third stage of the processor pipeline configured to write the instruction to the second datastore based on a dispatch of the instruction.

7. The system of claim 6 wherein the second stage of the processor pipeline is configured to initiate full reprocessing using the instruction stored in the second datastore.

8. The system of claim 7 further comprising one or more additional stages of the processor pipeline configured to perform the full reprocessing of the instruction.

9. The system of claim 1 further comprising a fourth stage of the processor pipeline configured to perform error checking based on the subset of information stored in the first datastore.

10. The system of claim 1 further comprising a fifth stage of the processor pipeline configured to perform Address Generation Interlock checking based on the subset of information stored in the first datastore.

11. A method for executing an instruction for performing a first operation and a second operation, the method comprising:
writing, by a first stage of a processor pipeline, a subset of information to a first datastore coupled to the first stage of the processor pipeline;
providing a second stage of the pipeline that is coupled to the first stage of the processor pipeline;
storing, by the processor pipeline, a subset of information to the first datastore based on execution progress of the instruction;
based on a rejection event of the second operation following a successful completion of the first operation initiating, by the second stage of the processor pipeline, a partial reprocessing, the partial reprocessing comprising using the subset of information stored in the first datastore to continue processing the instruction, at the first stage of the pipeline, with the second operation; and based on a rejection event of a first occurring operation of the instruction initiating by the second stage of the processor pipeline, full reprocessing, the full reprocessing comprising processing the instruction, at the first stage of the pipeline as a new instruction.

12. The method of claim 11 wherein the writing the subset of information includes writing validity data, an instruction type, an instruction state, parity data, and general purpose register data to the first datastore.

13. The method of claim 11 further comprising performing error checking based on the subset of information stored in the first datastore.

14. The method of claim 11 further comprising performing Address Generation Interlock checking based on the subset of information stored in the first datastore.

15. A computer program product for executing an instruction for performing a first operation and a second operation, the computer program product comprising a non-transitory tangible storage medium readable by a processing circuit and storing instructions for execution by the processing circuit for performing a method comprising:

writing, by a first stage of a processor pipeline, a subset of information to a first datastore coupled to the first stage of the processor pipeline;

providing a second stage of the pipeline that is coupled to the first stage of the processor pipeline;

storing, by the processor pipeline, a subset of information to the first datastore based on execution progress of the instruction;

based on a rejection event of the second operation following a successful completion of the first operation initiating, by the second stage of the processor pipeline, a partial reprocessing, the partial reprocessing comprising using the subset of information stored in the first datastore to continue processing the instruction, at the first stage of the pipeline, with the second operation; and based on a rejection event of a first occurring operation of the instruction initiating by the second stage of the processor pipeline, full reprocessing, the full reprocessing comprising processing the instruction, at the first stage of the pipeline as a new instruction.

16. The computer program product of claim 15 wherein the writing the subset of information includes writing validity data, an instruction type, an instruction state, parity data, and general purpose register data to the first datastore.

* * * * *